(12) United States Patent
Gough et al.

(10) Patent No.: US 10,339,002 B2
(45) Date of Patent: Jul. 2, 2019

(54) CATASTROPHIC DATA LOSS AVOIDANCE

(71) Applicant: VMware, Inc., Palo Alto, CA (US)

(72) Inventors: Michael Gough, San Jose, CA (US); Rick Brauen, Puyallup, WA (US)

(73) Assignee: VMware, Inc., Palo Alto, CA (US)

( * ) Notice: Subject to any disclaimer, the term of this patent is extended or adjusted under 35 U.S.C. 154(b) by 88 days.

(21) Appl. No.: 15/176,104

(22) Filed: Jun. 7, 2016

(65) Prior Publication Data

US 2016/0328293 A1 Nov. 10, 2016

Related U.S. Application Data (63) Continuation of application No. 14/209,792, filed on Mar. 13, 2014, now Pat. No. 9,367,253.

(51) Int. Cl.
| | |
|---|---|
| *G06F 11/10* | (2006.01) |
| *G06F 3/06* | (2006.01) |
| *G06F 11/14* | (2006.01) |
| *H04L 29/14* | (2006.01) |
| *G06F 11/20* | (2006.01) |
| *H04L 29/08* | (2006.01) |

(52) U.S. Cl.
CPC .......... *G06F 11/1076* (2013.01); *G06F 3/064* (2013.01); *G06F 3/067* (2013.01); *G06F 3/0619* (2013.01); *G06F 3/0647* (2013.01); *G06F 3/0689* (2013.01); *G06F 11/14* (2013.01); *G06F 11/2094* (2013.01); *H04L 29/14* (2013.01); *H04L 67/1097* (2013.01); *G06F 2211/1028* (2013.01)

(58) Field of Classification Search
CPC ............ G06F 11/1464; G06F 11/1469; G06F 11/1453; G06F 11/2094; G06F 11/2097; G06F 11/2082; G06F 11/2038; G06F 11/2046; G06F 11/20
See application file for complete search history.

(56) References Cited

U.S. PATENT DOCUMENTS

| | | | |
|---|---|---|---|
| 8,700,669 B1 | 4/2014 | Glidewell et al. | |
| 8,719,594 B2 * | 5/2014 | Dodgson | H04L 9/085 |
| | | | 713/193 |
| 8,751,897 B2 * | 6/2014 | Borthakur | G06F 11/2053 |
| | | | 714/755 |
| 8,892,250 B2 * | 11/2014 | Ha | B25J 9/08 |
| | | | 318/568.11 |
| 9,154,298 B2 * | 10/2015 | Resch | G06F 21/6272 |
| 9,578,288 B2 * | 2/2017 | Chen | H04N 7/17318 |
| 2003/0204539 A1 * | 10/2003 | Bergsten | G06F 11/201 |

(Continued)

*Primary Examiner* — Nadeem Iqbal
(74) *Attorney, Agent, or Firm* — Loza & Loza, LLP (57) ABSTRACT

Exemplary methods, apparatuses, and systems divide data into a plurality of portions such that the data is recoverable using a subset of the plurality of portions. For each portion of the data, a storage device different than storage devices storing all other portions of the data is selected. The selecting of storage devices includes distributing the portions of data based upon diversity of geographic locations of storage devices and diversity of storage device characteristics. The storage device characteristics include at least one of hardware characteristics, software characteristics, and operating history characteristics. Each portion of the data is stored on a corresponding selected storage device.

20 Claims, 5 Drawing Sheets

(56) References Cited

U.S. PATENT DOCUMENTS

| | | | |
|---|---|---|---|
| 2010/0162002 A1* | 6/2010 | Dodgson | G06F 21/6218 |
| | | | 713/193 |
| 2010/0162003 A1* | 6/2010 | Dodgson | G06F 11/1456 |
| | | | 713/193 |
| 2010/0169575 A1* | 7/2010 | Masaki | G06F 11/1092 |
| | | | 711/114 |
| 2010/0235410 A1* | 9/2010 | Apacible | G06F 21/6218 |
| | | | 707/812 |
| 2010/0274982 A1 | 10/2010 | Mehr et al. | |
| 2011/0016351 A1 | 1/2011 | Turner et al. | |
| 2011/0106769 A1 | 5/2011 | Baptist et al. | |
| 2012/0331088 A1 | 12/2012 | O'Hare et al. | |
| 2013/0304746 A1 | 11/2013 | Dhuse et al. | |
| 2014/0047266 A1* | 2/2014 | Borthakur | G06F 11/2053 |
| | | | 714/6.24 |
| 2014/0068791 A1* | 3/2014 | Resch | G06F 21/6272 |
| | | | 726/30 |
| 2014/0149356 A1* | 5/2014 | Agarwal | G06F 17/30008 |
| | | | 707/652 |

\* cited by examiner

CATASTROPHIC DATA LOSS AVOIDANCE

CROSS-REFERENCE TO RELATED APPLICATIONS

This application is a continuation of U.S. application Ser. No. 14/209,792, filed on Mar. 13, 2014, issued as U.S. Pat. No. 9,367,253, which is hereby incorporated by reference.

FIELD OF THE INVENTION

The various embodiments described herein relate to distributed replication and erasure coding used to provide for the recovery of data in the event of storage device failure or other system failures. In particular, embodiments described herein relate to the selection of storage devices to respectively store different portions of replicated or erasure coded data.

BACKGROUND OF THE INVENTION

Providers of massive online storage must balance the heavy demands of availability, performance, reliability, and cost. Distributed replication and erasure coding are used to provide for the recovery of data in the event of storage device failure or other system failures. Erasure coding is a method of data protection in which data is broken into fragments, expanded and encoded with redundant data pieces and stored across a set of different locations, e.g., storage devices in different geographic locations. Erasure coding creates a mathematical function (e.g., polynomial interpolation or oversampling) to describe a set of numbers so they can be checked for accuracy and recovered if one is lost. Erasure coding can be represented in simple form by the following equation: $n=k+m$. The variable "k" is the original number of portions of data. The variable "m" stands for extra or redundant portions of data that are added to provide protection from failures. The variable "n" is the total number of portions of data created after the erasure coding process. For example, in a 10 of 16 configuration, 6 extra portions of data (m) are added to the 10 base portions (k). The 16 data portions (n) are distributed across 16 storage devices. In the event of data loss or a lost connection to one or more storage devices, the original data can be reconstructed using any 10 of the 16 fragments.

Despite the use of these techniques, there still have been cases of catastrophic data loss. Catastrophic data includes a loss of data that cannot be recovered despite the use of erasure coding. Such data loss can lead to liability costs and significant consequences to the brand of the online storage provider. As the amount of data stored by each device grows, so does the catastrophic nature of the data loss. This catastrophic data loss typically involves coincident storage device failures. Coincident failures are often attributable to commonalities in storage device origin and usage and over-reliance upon the reported mean time to failure (MTTF) for each storage device. For example, a massive online storage provider may establish multiple data centers using storage devices purchased at the same time from the same manufacturer. While these storage devices are operated in different geographic locations, they may be subject to similar manufacturing defects and/or common wear-out characteristics that lead to coincident failures. Even with improvements to manufacturing and general longevity of storage devices, it is safe to assume that all devices will eventually fail and when they will fail is unknown.

SUMMARY OF THE INVENTION

Exemplary methods, apparatuses, and systems divide data into a plurality of portions such that the data is recoverable using a subset of the plurality of portions. For each portion of the data, a storage device different than storage devices storing all other portions of the data is selected. The selecting of storage devices includes distributing the portions of data based upon diversity of geographic locations of storage devices and diversity of storage device characteristics. The storage device characteristics include at least one of hardware characteristics, software characteristics, and operating history characteristics. Each portion of the data is stored on a corresponding selected storage device.

In one embodiment, the distribution of the portions of data based upon diversity of geographic locations of storage devices and diversity of storage device characteristics includes generating a spatial representation of a plurality of storage devices. The generated spatial representation is defined by the combination of geographic locations of the storage devices and storage device characteristics. Additionally, the spatial representation includes each of the plurality of storage devices as a set of one or more coordinates within the spatial representation. Storage devices are selected to maximize distances between the set of coordinates for each selected storage device and the sets of coordinates for all other selected storage devices. For example, home position coordinates within the spatial representation that maximize distances from one another may be determined and a storage device with a set of coordinates near each determined home position is selected. If the storage device characteristics for a first selected storage device change, causing the set of coordinates for the storage device to change such that the updated set of coordinates is beyond a threshold distance from a corresponding home position, a second storage device with a set of coordinates near that home position is selected. The portion of data stored on the first selected storage device is transferred to the second storage device in response to the selection of the second storage device.

In one embodiment, in response to detecting a failure of a first selected storage device storing a first portion of the data, each portion of the data from remaining selected storage devices is copied to one or more back up storage devices. Once the remaining portions have begun the back up process or have been backed up, the first portion of the data is recovered using a corresponding subset of the plurality of portions.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein distribute portions of erasure coded or replicated data based upon diversity of geographic locations of storage devices and diversity of storage device characteristics. As a result, catastrophic data loss caused by coincident failures are reduced. In one embodiment, home positions in a spatial representation are used to guide the selection of diverse storage devices. As storage device location or characteristics change, one or more portions of the erasure coded or replicated data are redistributed to storage devices in closer proximity to the home positions. As a result, the diversity of storage devices storing the erasure coded or replicated data is maintained over time. Additionally, data recovery can take a significant amount of time (especially with larger amounts of data) during which remaining portions of erasure coded or replicated data may be at risk. Given the stakes of catastrophic data loss, embodiments described herein copy each remaining portion of the erasure coded or replicated data to one or more back up storage devices in response to detecting data loss, resulting in a rapid reduction of risk of further loss during the potentially lengthy process of recovery.

Figure 1:
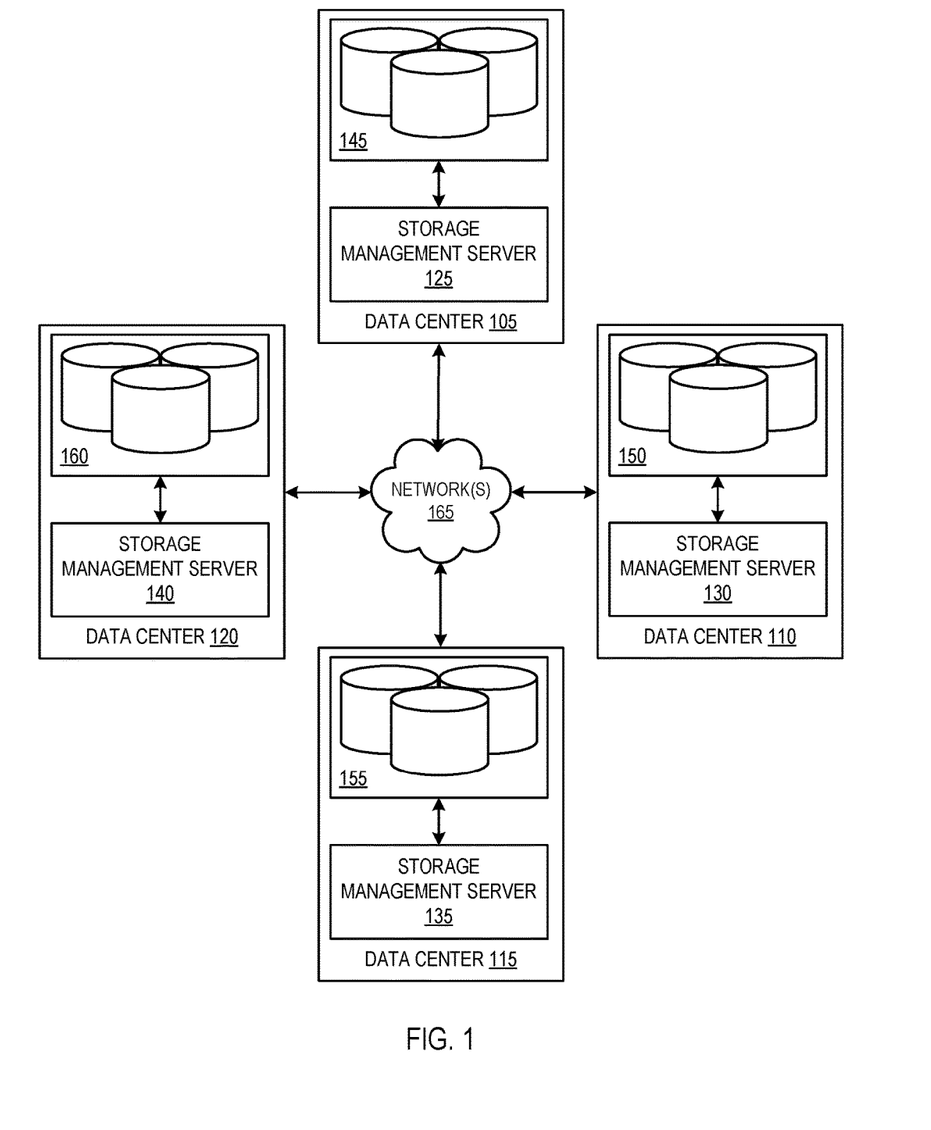
FIG. 1 illustrates, in block diagram form, an exemplary network of data centers including one or more storage management servers implementing the selection of diverse storage devices to store erasure coded data.

FIG. 1 illustrates, in block diagram form, data centers 105-120 including one or more storage management servers 125-140 implementing the selection of diverse storage devices to store erasure coded data described herein. In one embodiment, each of data centers 105-120 represents a data center within a different city or within a different geographic location within the same city as another data center. Each of data centers 105-120 includes, respectively, one or more storage devices 145-160. Exemplary storage devices include tape drives, disk drives, optical drives, flash drives, etc. Each of storage devices 145-160 may be organized within a geographic location hierarchy based upon and described by one or more of the following location designations: city, data center, nearest router, nearest switch, network hops from a network device, rack, drive bay, and slot. One or more of these location designations may serve as a geographic location for a storage device. Additionally, each of storage devices 145-160 is described by storage device characteristics. Exemplary storage device characteristics include hardware characteristics, software characteristics, and operating history characteristics. Exemplary hardware characteristics include the manufacturer of the storage device, date of manufacture of the storage device, brand name of the storage device, model identifier of the storage device, supplier of one or more components or materials of the storage device, and specific materials used in the manufacture of data dependent components of the storage device (e.g., drive coatings, helium containment, etc.). Exemplary software characteristics include the firmware identifier or version running on the storage device, operating system identifier or version running on the storage device, software identifier or version of software running on the storage device. Exemplary operating history characteristics include the date of first use of the storage device, length of use of the storage device, operating temperature history of the storage device, seismic events experienced by the storage device, storage capacity of the storage device, history of utilization of the storage capacity of the storage device, and history of errors/failures for the storage device. In one embodiment, each storage device 145-160 stores its respective geographic location and storage device characteristic data. Alternatively, the geographic location and storage device characteristic data for one or more storage devices 145-160 are stored centrally within/external to one of data centers 105-120.

In one embodiment, storage management servers 125-140 manage, respectively, the storage of data on storage devices 145-160. For example, storage management server 125 may allocate one or more of storage device(s) 145, or a portion thereof, for use by client devices, web servers, databases, etc. (not shown). Additionally, storage management servers 125-140 implement catastrophic data loss avoidance. For example, storage management server 125 may use erasure coding to protect data stored on one or more of storage device(s) 145. In doing so, storage management server 125 divides the data into portions, creates any redundant/oversampled portions to facilitate recovery, and distributes the portions to other storage devices 145-160 using the corresponding geographic location and storage device characteristic data as described herein. Embodiments are described herein with reference to erasure coded data for ease of explanation. Other forms of data protection, such as partial or complete replication of data to multiple storage devices, may also utilize the embodiments described herein. In one embodiment, storage management server 125 requests, receives, or otherwise accesses geographic location and storage device characteristic data for storage devices 145-160 to select a diverse set of storage devices to store the portions of data. Alternatively, another storage management server 130-40 or other storage management device implements the dividing of data, creation of redundant/oversampled portions, and/or selection of storage devices 145-160.

Additionally, each of data centers 105-120 is coupled to one or more network(s) 165 (e.g., a local area network or other private or publically accessible wide area network, such as the Internet, or combination thereof). Network(s) 165 facilitate communication between storage management servers 125-140 and storage devices 145-160, thereby enabling the transfer of the aforementioned erasure coded data portions, geographic location and storage device characteristic data, and notices of data/network errors and failures.

Figure 2:
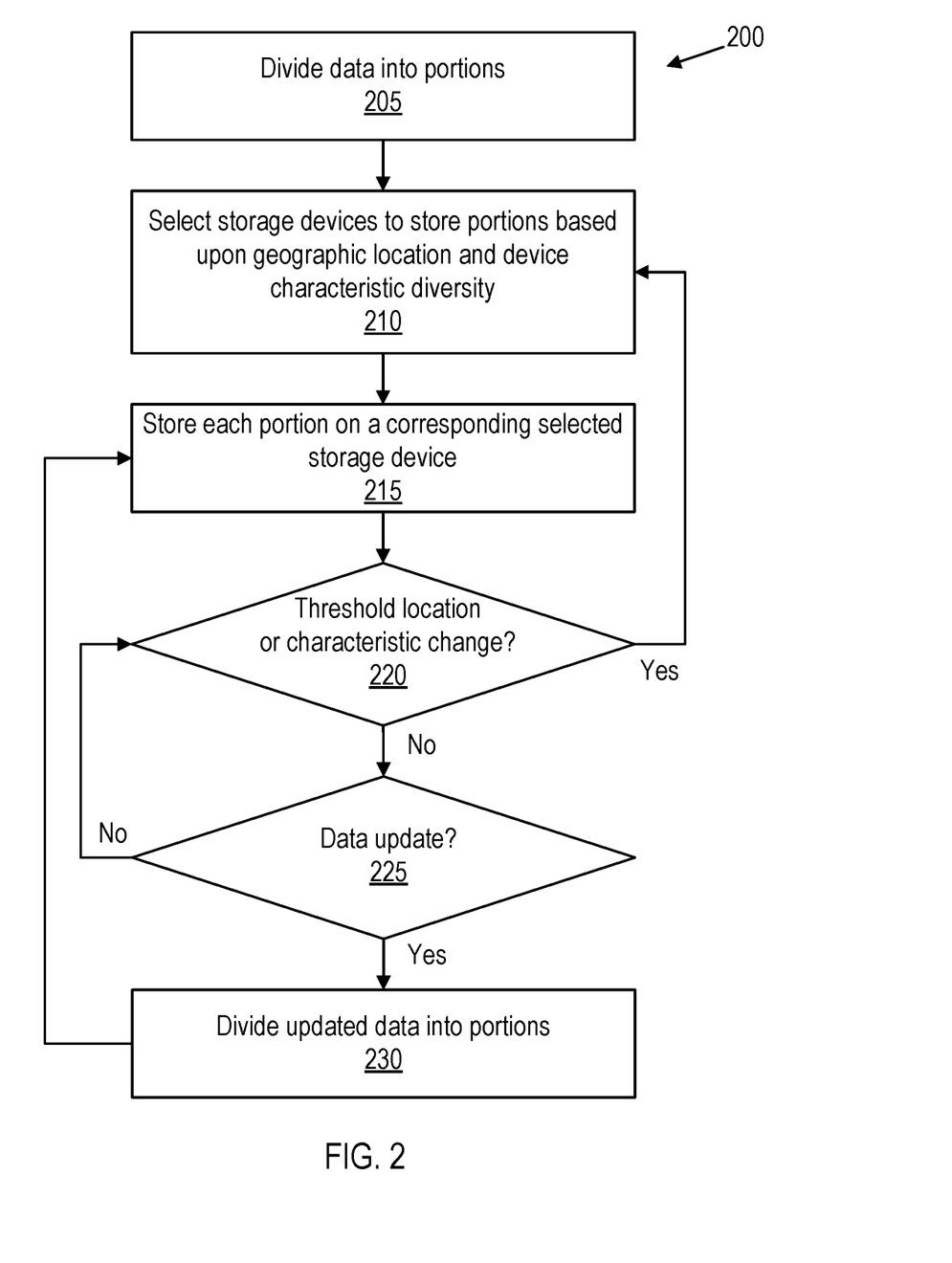
FIG. 2 is a flow chart illustrating an exemplary method of distributing erasure coded data among diverse storage devices.

FIG. 2 is a flow chart illustrating an exemplary method 200 of distributing erasure coded data among diverse storage devices. At block 205, a storage management server divides data to be protected into portions and creates any redundant/oversampled portions to facilitate recovery. For example, the storage management server may utilize Reed-Solomon codes, Tornado codes, or another erasure coding algorithm.

At block 210, the storage management server selects a storage device for each portion of the erasure coded data. The storage management server selects storage devices based upon a diversity of geographic location and a diversity of storage device characteristics. For example, distributing portions of the erasure coded data across diverse geographic locations reduces the likelihood of losing multiple portions due to a single cause that is likely to affect all or a portion of a data center, such as power failure, failure to maintain an operating temperature, network failure, earthquake, meteor strike, flood, act of terror/war, or other event that may erase or corrupt the portions of data or otherwise prevent access to the portions data. Distributing portions of the erasure coded data across storage devices with diverse storage device characteristics reduces the likelihood of losing multiple portions due to coincident failures, such as common manufacturing defects, firmware/software defects, prior exposure to hazardous environmental conditions that may expedite failure, etc. These coincident failures may occur in multiple geographic locations within the same time frame, e.g., as a result of a group of storage devices each having the same or highly similar components, firmware, software, etc.

In one embodiment, selecting storage devices based upon a diversity of geographic location and a diversity of storage device characteristics includes the storage management server receiving or otherwise accessing geographic location and storage device characteristic data for storage devices available to store portions of the erasure coded data. It should be noted that, in one embodiment, the storage management server is not centralized and its duties are performed in decentralized, distributed fashion. The storage management server uses the geographic location and storage device characteristic data to determine the similarity/difference distance between the storage devices. For example, the distance between geographic locations may be measured in physical distance (e.g., difference in physical locations) or network distance (e.g., network hops). In one embodiment, the distance between geographic locations includes a distance corresponding to slots within the same drive bay or rack, between racks within the same data center, between data centers within the same city, etc. In one embodiment, the distance between geographic locations includes a distance corresponding to network/connectivity infrastructure. For example, the geographic location distance may represent whether or not two storage devices are dependent (either directly or indirectly) upon the same network infrastructure for connectivity to the greater network of storage devices. The distance between versions of software/firmware may be measured in a number of shared lines of code. The distance between models may be measured in dates of manufacture, number of different components, number of different suppliers, etc. Additionally, distances may be assigned defined values corresponding to a scale from dissimilar to similar/same. In one embodiment, the geographic location and a diversity of storage device characteristics are weighted to give greater or lesser impact to the geographic location and/or individual or groups of storage device characteristics.

In one embodiment, the storage management server generates a spatial representation of the storage devices using the geographic location. A separate spatial representation may, for example, be created using storage device characteristic data. In these spatial representations, the storage management server treats each storage device as a point or vector within an n-dimensional space. For example, a cumulative value representing the geographic location and storage device characteristic data for each storage device may be mapped to a single dimension (e.g., a point on a line represented by a single coordinate value) or to a point in multiple dimensions (e.g., a point represented by a set of multiple coordinate values). With the storage devices represented in an n-dimensional space of this example, a cost matrix can be generated which expresses the relative distances of the devices represented therein. Such a cost matrix can be solved for an optimal or near optimal "tour" of the devices contained therein, resulting in a cyclic tour of the represented devices such that similar devices are clustered. Persons of skill in the art will recognize that solvers for the travelling salesman problem, for example, can be applied to produce such a tour using a cost matrix as input. Since there are multiple ways in which the devices can be clustered, e.g. geographically and by device characteristic, this clustering operation can be performed according to each of these various types of clustering. Once completed, the tours represent a concise and clustered representation of the storage devices that were previously represented in the multidimensional space(s). In certain embodiments, each device is represented on each of the tours. The position of a given device on each of the tours may be used to produce coordinates to position the device in a new clustered space in which devices which are similar with respect to one or more kinds of similarity, e.g. geographic or by device characteristic, are grouped generally together.

In one embodiment, the storage management server stores the coordinate/vector values for each storage device in a data structure to easily represent and sort spatial relationships between storage devices. For the various embodiments pertaining to multidimensional spaces, the storage management server may use quad-trees, k-d trees or the like to store the coordinate/vector values. In one embodiment, the storage management server maps a value representing the geographic location to a first dimension and maps a value representing storage device characteristics to a second dimension that is orthogonal to the first dimension. These coordinate values may be obtained, for example, from their positions in the cyclic tours corresponding to the orthogonal dimensions. In yet another embodiment, these two orthogonal dimensions are mapped to a surface of a three-dimensional object. Exemplary spatial representations are further described with reference to FIG. 3.

Based upon the defined spatial representation, the storage management server is able to calculate a distance between any two storage devices. With the calculated distances, the storage management server, when assigning storage devices to store portions of original and erasure coding data blocks, selects a set of multiple storage devices to maximize the distances between selected storage devices. For example, the storage management server may perform a brute force algorithm and calculate distances between all storage devices. Alternatively, the storage management server creates clusters of storage devices based upon coordinate values and calculates distances between the clusters. For example, the storage management server may perform a centroidal Voronoi tessellation algorithm, such as k-means/Lloyd's algorithm for clustering, to define regions/clusters of storage devices. In some embodiments, the Voronoi tessellation is weighted such that the resultant tessellation is comprised of regions that are proportional in area to a chosen characteristic. For example, the amount of currently available storage on the various devices could be used to determine the relative area of corresponding regions of the tessellation. In some embodiments, the initial positions of the centroids corresponding to the devices are selected based on their positions in the cyclic tours. The storage management server selects a position within each region/cluster, e.g., the centroid, to act as a home position for that region/cluster. In one embodiment, the storage management server selects clusters to maximize the distance between clusters and selects a storage device within each selected cluster, e.g., a storage device nearest to the home position. Exemplary methods of maximizing the distances between selected storage devices are further described with reference to FIG. 3.

At block 215, the storage management server stores each portion of the erasure coded data on a corresponding selected storage device. For example, the storage management server transmits the portions or instructs the storage device(s) to transmit the portions to the selected storage devices or storage management servers managing the selected storage devices. As a result, the erasure coded data is stored on a diverse set of storage devices, thereby minimizing catastrophic data loss.

The geographic location or storage device characteristics of each storage device may change over time. For example, software/firmware updates and operating history events are likely to create changes to the overall storage device characteristics for a storage device. Additionally, an initial determination of storage device diversity (e.g., based upon a spatial representation of geographic location and storage device characteristics) may only include a subset of all storage device characteristics for the storage devices. In one embodiment, in response to a determination that an excluded storage device characteristic is significant (e.g., lead to an error, failure, or data loss), the subset of storage device characteristics is updated to include the previously excluded storage device characteristic. Such changes equate to different coordinate values for storage devices in the spatial representation and, therefore, different distances between storage devices. At block 220, the storage management server optionally monitors these changes and determines if the selection of storage devices is to be updated. If an updated set of one or more coordinate values for a selected storage management value has changed by a threshold amount, method 200 returns to block 210 to reselect one or more storage devices. For example, if the storage management server determines a selected storage device has moved towards another selected storage device in the spatial representation by a threshold value, the selected storage device has moved outside of a cluster or position within a cluster by a threshold value, or the selected storage device is now within a threshold distance from another selected storage device, the storage management server determines one or more portions of erasure coded data are to be transferred to newly selected storage devices.

If the geographic location or storage device characteristics of a selected storage device has not changed by a threshold amount, or if such changes are not monitored, at block 225, the storage management server determines if the erasure coded data has changed by a threshold amount. If not, method 200 returns to block 220 or, alternatively, to 225 to continue monitoring for changes.

If the erasure coded data has changed by the threshold amount, at block 230, the storage management server divides the updated data into portions and creates any redundant/oversampled portions, e.g., as described with reference to block 205. Method 200 then returns to 215 to distribute the new portions of erasure coded data to the selected storage devices. Additionally, in response, the selected storage devices may delete or overwrite the previously stored portions of erasure coded data. Alternatively, method 200 returns to block 210 to reselect storage devices to store the portions of erasure coded data. For example, the updated data may be divided into a different number of portions or the storage management server may use the update of data as an opportunity to address any movement of storage devices within the spatial representation.

Figure 3:
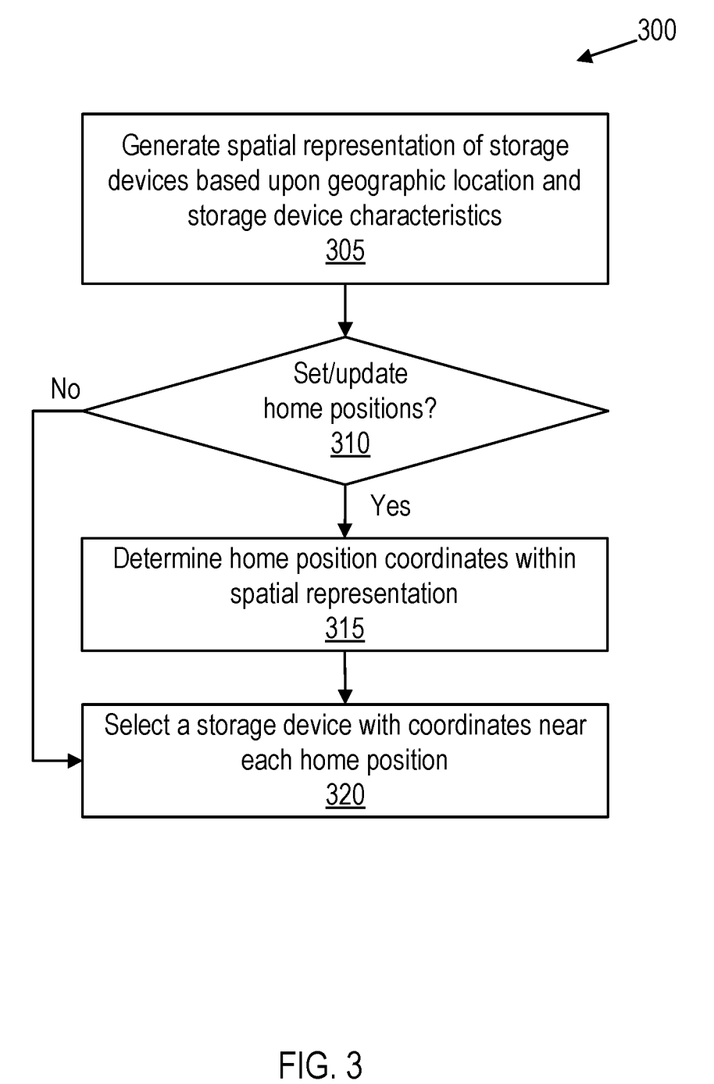
FIG. 3 is a flow chart illustrating an exemplary method of selecting and maintaining the diversity of storage devices as device characteristics change.

FIG. 3 is a flow chart illustrating exemplary method 300 of selecting and maintaining the diversity of storage devices as device characteristics change. In one embodiment, method 300 is performed as a part of block 210 described above.

At block 305, the storage management server generates a spatial representation of storage devices based upon geographic location and storage device characteristics. As described above, the spatial representation may be in n-dimensions for any positive number n. In one embodiment, the generation of the spatial representation includes calculating an n-dimensional representation of the storage device characteristics (without geographic location). The storage management server assigns one or more characteristics to each dimension and determines, for each storage device, a set of one or more coordinates in the n-dimensional space as a representation of the storage device (e.g., using values associated with each characteristic as described above). The storage management server determines a cyclic tour of all representations of the storage devices, e.g., using an algorithm that solves the travelling salesman problem. The distance values of the cyclic tour are in turn used to determine relative coordinate positions of each storage device in one dimension of the overall spatial representation. Likewise, this embodiment of the generation of the spatial representation includes calculating an n-dimensional representation of the geographic location of each storage device (without storage device characteristics). The storage management server determines a cyclic tour of all representations of the storage devices, e.g., using an algorithm that solves the travelling salesman problem. Alternatively, the storage management server performs a depth first traversal of a tree-based data structure representing storage device characteristics or relative geographic locations of the storage devices to generate one or both of the cyclic tours. The storage management server uses the distance values of the cyclic tour to determine coordinate positions of each storage device in an orthogonal dimension of the overall spatial representation. For example, the storage management server may use the two cyclic tours to determine radial values of orthogonal dimensions of torus to represent the storage devices as points on the surface of the torus.

At block 310, the storage management server determines whether or not to set or update home positions for the stored portions of the erasure coded data. For example, the first selection or updated selection of storage devices described above may trigger the storage management server to set or update home positions. Alternatively, home positions may be updated periodically, in response to an administrator command, based upon the amount of available storage space within a region/cluster, in response to a threshold number of storage devices being added or removed from the network, in response to another change to the network infrastructure, or in response to a threshold change in device characteristics.

If the storage management server determines to set or update home positions, at block 315, the storage management server determines potential home position coordinates within the spatial representation for each portion of the erasure coded data. In one embodiment, as described above, the storage management server utilizes a centroidal Voronoi tessellation algorithm to define regions/clusters of storage devices. For example, the storage management server may define regions/clusters on the surface of the torus. The storage management server selects a position within each region/cluster, e.g., the centroid, to act as a home position for that region/cluster.

If the storage management server determines that existing home positions are not to be updated or after setting/updating the home positions, at block 320, the storage management server selects a storage device with coordinates near each home position. Selecting storage devices with coordinates near each home position includes selecting new storage devices to store one or more portions of erasure coded data, confirming previously selected storage devices to continue storing one or more portions of erasure coded data, or a combination thereof.

As described above, introduction or removal of storage devices, changes in geographic location, or storage device characteristics result in changes to the coordinates of storage devices within the updated spatial representation. As a result, a storage device may drift away from a home position. Utilizing method 300, the storage management server maintains a set of selected storage devices, e.g., within a threshold distance of determined home positions.

Figure 4:
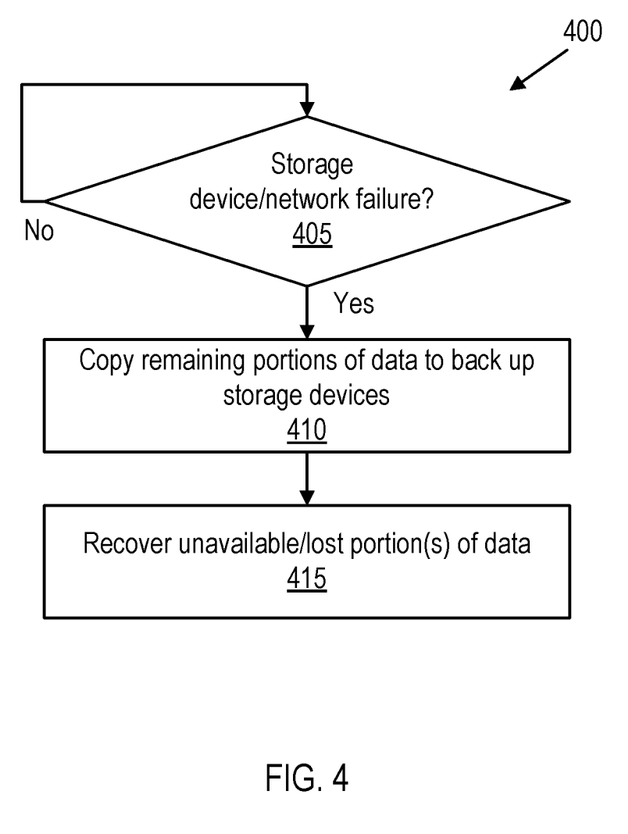
FIG. 4 is a flow chart illustrating an exemplary method of backing up erasure coded data in response to data loss and prior to recovering the lost data.

FIG. 4 is a flow chart illustrating exemplary method 400 of backing up erasure coded data in response to data loss. At block 405, the storage management server monitors the network of storage devices for a storage device failure, network failure, or other indication of loss of a portion of the erasure coded data. For example, multiple storage management servers may provide one another with a heartbeat signal and/or notifications of data loss or corruption. If the storage management server determines that a threshold number of portions of the erasure coded data have not been lost, method 400 returns to/stays at block 405 and the storage management server continues to monitor the network of storage devices for failures.

In response to the storage management server determining that a threshold number of portions of the erasure coded data have been lost, at block 410, the storage management server copies remaining portions of the erasure coded data to back up storage devices. For example, the storage management server may initiate the copying of the remaining portion from each selected storage devices to one or more of the other selected storage devices, one or more unselected storage devices, or to portable storage devices or other designated back up storage devices locally within the respective data center.

At block 415, in response to copying the remaining portions of erasure coded data (e.g., initiating the copying, copying a threshold amount, or competing the copying), the storage management server recovers the lost portions of the erasure coded data according to the erasure coding algorithm.

Figure 5:
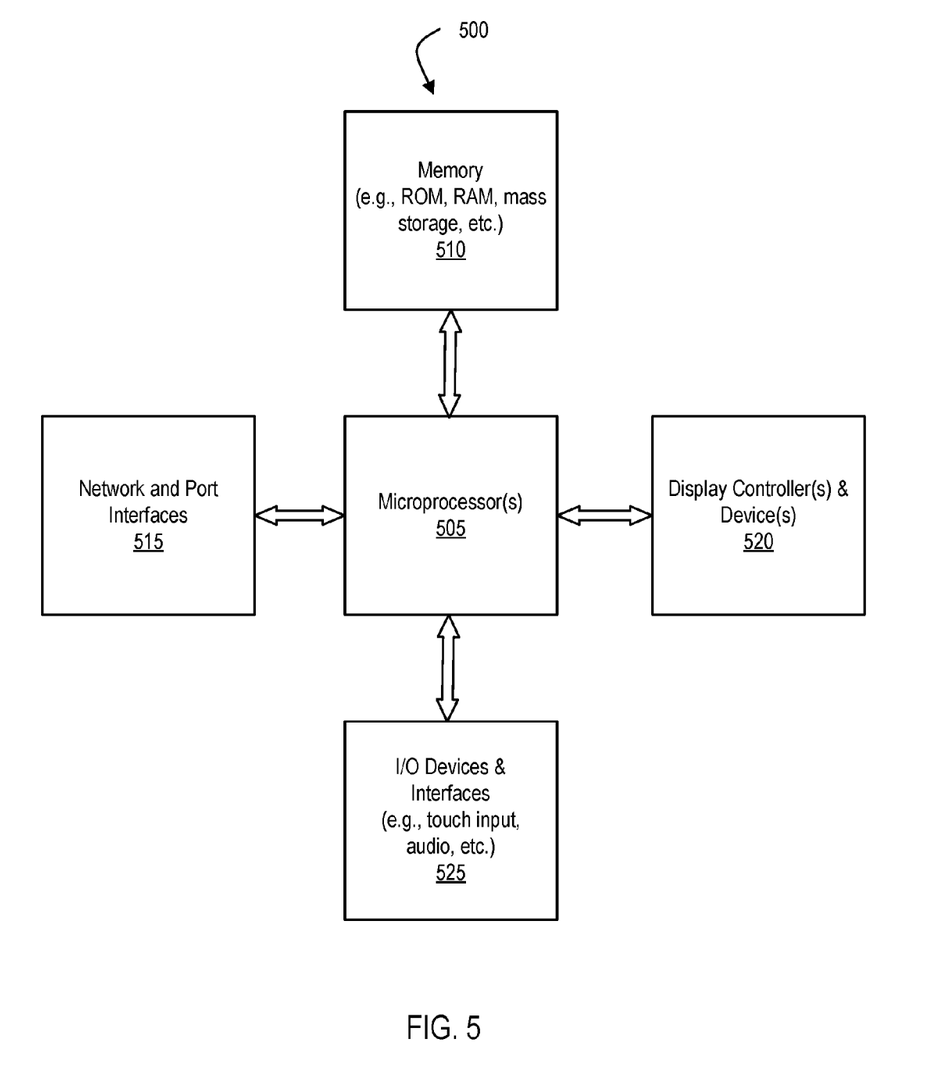
FIG. 5 illustrates, in block diagram form, an exemplary processing system to implement the selection of diverse storage devices to store erasure coded data.

FIG. 5 illustrates, in block diagram form, an exemplary processing system to implement the selection of diverse storage devices to store erasure coded data. Data processing system 500 includes one or more microprocessors 505 and connected system components (e.g., multiple connected chips). Alternatively, data processing system 500 is a system on a chip.

Data processing system 500 includes memory 510, which is coupled to microprocessor(s) 505. Memory 510 may be used for storing data, metadata, and programs for execution by the microprocessor(s) 505. Memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 510 may be internal or distributed memory.

Data processing system 500 includes network and port interfaces 515, such as a port, connector for a dock, or a connector for a USB interface, FireWire, Thunderbolt, Ethernet, Fibre Channel, etc. to connect the system 500 with another device, external component, or a network. Exemplary network and port interfaces 515 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 500 with another device, external component, or a network and receive stored instructions, data, tokens, etc.

Data processing system 500 also includes display controller and display device 520 and one or more input or output ("I/O") devices and interfaces 525. Display controller and display device 520 provides a visual user interface for the user. I/O devices 525 allow a user to provide input to, receive output from, and otherwise transfer data to and from the system. I/O devices 525 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 5.

Data processing system 500 is an exemplary representation of one or more of storage management servers 125-140 and storage devices 145-160 described above. Data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 500 may be a network computer, server, or an embedded processing device within another device or consumer electronic product. As used herein, the terms computer, device, system, processing system, processing device, and "apparatus comprising a processing device" may be used interchangeably with data processing system 500 and include the above-listed exemplary embodiments.

It will be appreciated that additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented methods 200, 300, and 400 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via network interface device 515. In various embodiments, hardwired circuitry may be used in combination with the software instructions to implement the present embodiments. Thus, the techniques are not limited to any specific combination of hardware circuitry and software, or to any particular source for the instructions executed by data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. As used herein, the term "exemplary" refers to embodiments that serve as simply an example or illustration. The use of exemplary should not be construed as an indication of preferred examples. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be appreciated that the embodiments described herein will inherently handle various situations that arise in an operational system. For example, the problem of network congestion is addressed in part by the wide distribution of data blocks. The input/output operations needed to retrieve the blocks are distributed throughout the available infrastructure, and are performed concurrently.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method for recovering data that has been divided into a plurality of portions, the method comprising:
    detecting an indication of a loss of at least one portion of the plurality of portions of the data, wherein the data is recoverable using a subset of the plurality of portions of the data stored in multiple storage devices;
    copying remaining portions of the data not indicated as being lost to backup storage devices in response to the detected indication; and
    after the copying of the remaining portions of the data is initiated, recovering the data using the remaining portions of the data,
    wherein the copying of the remaining portions of the data to the backup storage devices results in a risk reduction of further loss of the portions of the data.

2. The computer-implemented method of claim 1, wherein detecting the indication of a loss of at least one portion of the plurality of portions of the data includes detecting at least one of a storage device failure and a network failure.

3. The computer-implemented method of claim 1, wherein detecting the indication of a loss of at least one portion of the plurality of portions of the data includes using at least one of heartbeat signals and notifications of data loss to detect the indication of a loss of at least one portion of the plurality of portions of the data.

4. The computer-implemented method of claim 1, wherein copying of the remaining portions of the data not indicated as being lost to the backup storage devices is only executed when a threshold number of the portions of the data is indicated as being lost.

5. The computer-implemented method of claim 1, wherein copying of the remaining portions of the data not indicated as being lost to the backup storage devices includes copying each of the remaining portions of the data from a storage device within a data center to a backup storage device within the same data center.

6. The computer-implemented method of claim 1, wherein recovering the data using the remaining portions of the data is executed after a threshold amount of the remaining portions of the data has been copied to the backup storage devices or after all the remaining portions of the data has been copied to the backup storage devices.

7. The computer-implemented method of claim 1, further comprising selecting the multiple storage devices to store the portions of the data based upon diversity of geographic locations of the storage devices and diversity of storage device characteristics, the storage device characteristics including at least one of hardware characteristics, software characteristics, and operating history characteristics.

8. A non-transitory computer-readable medium storing instructions, which when executed by a processing device, cause the processing device to perform a method for recovering data that has been divided into a plurality of portions, the method comprising:
    detecting an indication of a loss of at least one portion of the plurality of portions of the data, wherein the data is recoverable using a subset of the plurality of portions of the data stored in multiple storage devices;
    copying remaining portions of the data not indicated as being lost to backup storage devices in response to the detected indication; and
    after the copying of the remaining portions of the data is initiated, recovering the data using the remaining portions of the data,
    wherein the copying of the remaining portions of the data to the backup storage devices results in a risk reduction of further loss of the portions of the data.

9. The non-transitory computer-readable medium of claim 8, wherein detecting the indication of a loss of at least one portion of the plurality of portions of the data includes detecting at least one of a storage device failure and a network failure.

10. The non-transitory computer-readable medium of claim 8, wherein detecting the indication of a loss of at least one portion of the plurality of portions of the data includes using at least one of heartbeat signals and notifications of data loss to detect the indication of a loss of at least one portion of the plurality of portions of the data.

11. The non-transitory computer-readable medium of claim 8, wherein copying of the remaining portions of the data not indicated as being lost to the backup storage devices is only executed when a threshold number of the portions of the data is indicated as being lost.

12. The non-transitory computer-readable medium of claim 8, wherein copying of the remaining portions of the data not indicated as being lost to the backup storage devices includes copying each of the remaining portions of the data from a storage device within a data center to a backup storage device within the same data center.

13. The non-transitory computer-readable medium of claim 8, wherein recovering the data using the remaining portions of the data is executed after a threshold amount of the remaining portions of the data has been copied to the backup storage devices or after all the remaining portions of the data has been copied to the backup storage devices.

14. The non-transitory computer-readable medium of claim 8, wherein the method further comprises selecting the multiple storage devices to store the portions of the data based upon diversity of geographic locations of the storage devices and diversity of storage device characteristics, the storage device characteristics including at least one of hardware characteristics, software characteristics, and operating history characteristics.

15. An apparatus for recovering data that has been divided into portions, the apparatus comprising:
   memory; and
   a processor configured to:
      monitor a network of storage devices with the portions of the data stored therein to detect loss of any portion of the data, wherein the data is recoverable using a subset of the portions of the data stored in the storage devices;
      initiate copying of remaining portions of the data that have not been lost to backup storage devices in response to the detected loss; and
      after the copying of the remaining portions of the data is initiated, initiate recovery of the data using the remaining portions of the data,
   wherein the copying of the remaining portions of the data to the backup storage devices results in a risk reduction of further loss of the portions of the data.

16. The apparatus of claim 15, wherein the processor is configured to detect at least one of a storage device failure and a network failure to detect the loss of any portion of the data.

17. The apparatus of claim 15, wherein the processor is configured to detect the loss of any portion of the data using at least one of heartbeat signals and notifications of data loss.

18. The apparatus of claim 15, wherein the processor is configured to initiate the copying of the remaining portions of the data only when a threshold number of the portions of the data is lost.

19. The apparatus of claim 15, wherein the processor is configured to initiate copying of each of the remaining portions of the data from a storage device within a data center to a backup storage device within the same data center.

20. The apparatus of claim 15, wherein the processor is configured to select the storage devices to store the portions of the data based upon diversity of geographic locations of the storage devices and diversity of storage device characteristics, the storage device characteristics including at least one of hardware characteristics, software characteristics, and operating history characteristics.

* * * * *